(12) United States Patent
van Zee

(10) Patent No.: US 6,904,171 B2
(45) Date of Patent: Jun. 7, 2005

(54) TECHNIQUE TO IDENTIFY INTERESTING PRINT ARTICLES FOR LATER RETRIEVAL AND USE OF THE ELECTRONIC VERSION OF THE ARTICLES

(75) Inventor: Pieter J. van Zee, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 09/738,209

(22) Filed: Dec. 15, 2000

(65) Prior Publication Data

US 2002/0076110 A1 Jun. 20, 2002

(51) Int. Cl.[7] .................................................. G06K 9/72
(52) U.S. Cl. ...................... 382/229; 382/305; 382/306
(58) Field of Search ................................. 382/173, 181, 382/209, 218, 224, 229, 305, 306; 358/403; 705/26; 707/1–10; 709/219, 203

(56) References Cited

U.S. PATENT DOCUMENTS

| | | | | |
|---|---|---|---|---|
| 4,965,763 A | * | 10/1990 | Zamora | 704/1 |
| 5,265,242 A | * | 11/1993 | Fujisawa et al. | 707/3 |
| 5,819,259 A | * | 10/1998 | Duke-Moran et al. | 707/3 |
| 5,991,755 A | * | 11/1999 | Noguchi et al. | 707/3 |
| 6,038,561 A | * | 3/2000 | Snyder et al. | 707/6 |
| 6,094,649 A | * | 7/2000 | Bowen et al. | 707/3 |
| 6,178,417 B1 | * | 1/2001 | Syeda-Mahmood | 707/3 |
| 6,182,090 B1 | * | 1/2001 | Peairs | 715/500 |
| 6,208,988 B1 | * | 3/2001 | Schultz | 707/5 |
| 6,263,121 B1 | * | 7/2001 | Melen et al. | 382/305 |
| 6,327,589 B1 | * | 12/2001 | Blewett et al. | 707/5 |
| 6,446,061 B1 | * | 9/2002 | Doerre et al. | 707/3 |
| 6,505,196 B2 | * | 1/2003 | Drucker et al. | 707/5 |
| 6,522,782 B2 | * | 2/2003 | Pass et al. | 382/218 |
| 6,625,624 B1 | * | 9/2003 | Chen et al. | 707/204 |
| 6,678,694 B1 | * | 1/2004 | Zimmermann et al. | 707/102 |

OTHER PUBLICATIONS

Ariki, et al. "Indexing and classification of TV articles based on telop recognition", IEEE, pp. 422–427, 1997.*

Renals, et al. "The THISL system for indexing and retrieval of broadcast news", IEEE, pp. 77–82, 1999.*

* cited by examiner

Primary Examiner—Daniel Miriam

(57) ABSTRACT

The present invention provides a method and system for efficient information storage and retrieval of information. The method includes the steps of: scanning/selecting/capturing a selected portion of text of the information wherein the selected portion of text scanned is typically a close-to-unique identifier of the text from which the portion was excerpted and serves as a key when the information is accessed electronically; and placing the key in an electronically available index/directory to facilitate retrieval of the information. The method may further include retrieving and storing the information associated with the key and using it to index, organize, and make available for search and retrieval the full information originally viewed by the user.

34 Claims, 4 Drawing Sheets

TECHNIQUE TO IDENTIFY INTERESTING PRINT ARTICLES FOR LATER RETRIEVAL AND USE OF THE ELECTRONIC VERSION OF THE ARTICLES

FIELD OF THE INVENTION

The present invention relates generally to information organization and retrieval, and more particularly to facilitating organization and retrieval of electronic information.

BACKGROUND OF THE INVENTION

The amount of information generated and available in today's environment tends to be overwhelming. The most important information to an individual is the information that he/she has examined and determined to be useful to him/her. Today, most important information is available or passes through electronic form, even though it may ultimately be distributed primarily in printed form. When information is received electronically, such information takes little physical space and may be indexed manually or using an automatic index and classification system so that it may be stored and retrieved at a later time. However, when the information is printed, it is often inconvenient or difficult to connect the printed information with its electronic counterpart. This may be true even if the individual printed the information from its electronic form, such with a personal printer.

Often, the individual receiving the information may wish to read it and keep it for future reference, but does not have the opportunity to read the information when it is received. For example, people may quickly review a magazine and bend down page corners of interesting articles or rip out the articles, often reading only headlines or a one to two paragraphs of the article. Items of interest, such as travel, ornithology, enology, viticulture and gardening may be placed on a countertop in a "holding" pattern, stacked in piles, put in boxes and folders, and moved several times before either being filed in a huge, often unsorted, pile or folder to be read at some future date, or filed in the trash.

Many people have no time for categorizing and organizing this saved information, and it ends up in a growing number of piles, often with years worth of unsorted information that is difficult to access in an efficient manner. Hence, the original purpose of saving the article for later reference or reading is defeated. For example, consider the subject of travel. An individual may sort all travel articles into a folder; if not, the travel articles are all mixed up in multiple places. Among the mass of saved articles, there may be an article on "The Best Places to Stay in Hawaii", another article on "Maui's Best Molokini Excursions", and many other articles on Europe, Tahiti, and the Virgin Islands.

If the family desires to go to Maui, finding the needed information in the saved articles may present a large task. First, the general location of the travel articles in piles or folders must be determined. Then, if the articles are categorized, the individual must sort through the articles. If the articles were classified rather definitively, under what title would the articles on the places to stay in Hawaii be stored? In a Hawaii folder? Are there sub-folders for each island? If the articles are not categorized, it will be even more difficult since the individual will have to sort the entire pile or box/boxes of articles. Clearly, organizing and retrieving the desired information that may be useful in the future is not a trivial task and is time-consuming.

Thus, there is a need for a method and system to facilitate organizing and retrieving both printed and electronic information efficiently.

SUMMARY OF THE INVENTION

The present invention provides a method for efficient information storage and retrieval of information. The method includes the step of scanning/selecting/capturing a selected portion of text of the information wherein the selected portion of text captured is a fragment of information content that may be used as an approximate identifier or "key" for the entire information and where the information may be stored and accessed electronically. Then, the selected portion of the text or "key" is placed in an electronically available index/directory to facilitate retrieval of the information from a storage medium having the information stored electronically.

The present invention may also be utilized as a system for efficient information storage and retrieval of information. In this embodiment, the invention includes an index/directory information retrieval unit, an index/directory storage unit, and a storage medium. The index/directory information retrieval unit is arranged to send a portion of text of the information to an index/directory storage unit. The index/directory information retrieval unit is used for scanning/selecting/capturing the portion of text of the information wherein the portion of text is a fragment of information content that may be used as an approximate identifier or "key" for the entire information. The information is stored and accessed electronically. The index/directory storage unit is arranged to receive and store the key from the index/directory information retrieval unit. The index/directory storage unit is used for storage of the key in an electronically available index/directory to facilitate retrieval of the information from a storage medium that is accessible electronically. The index/directory is arranged to be searched to identify information in the storage medium that corresponds to the key. Where the information is already in electronic form, the information is stored in a storage medium and made available for search and retrieval based on text fragments. Where the information is printed, the information is scanned and processed to facilitate search and retrieval based on text fragments and also ideally retain the form and presentation of the information to provide an electronic copy of the information which is then stored in a storage medium and made available for search and retrieval based on text fragments. For example, the information may be stored in a personal or organization-wide database, or may be from a commercially accessible database. Typically, a computer/user unit is coupled to or arranged to receive/send information from/to the index/directory unit and the storage medium and is used to request retrieval of information based on the key.

In one embodiment, the invention may be implemented by a computer-readable medium that has computer-executable instructions for performing steps for efficient information storage and retrieval of information. The computer-executable instructions perform the steps described above.

DETAILED DESCRIPTION OF THE PREFERRED EMBODIMENTS

The present invention provides a method and device for organizing and retrieving both printed and electronic information in which the information is identified by the person viewing the information by selection of a portion of the text, using the selection as a close-to-unique identifying "key", and where the information is not in electronic form, obtaining an electronic copy of the information and storing the information electronically, thus allowing one to locate the information quickly using the key. The invention applies to any given package of information from small to large that includes written or spoken language that can be processed as text sequences, and may also include other forms of information such as charts, pictures, audio, and video. For example, common information packages include an article and its associated charts or graphics, a book, a document, a webpage, a letter, a resume, a form, a press release, and so forth. While the term "article" is used for clarity of writing, those skilled in the art will understand it to be representative of many kinds of information packages.

Figure 1:
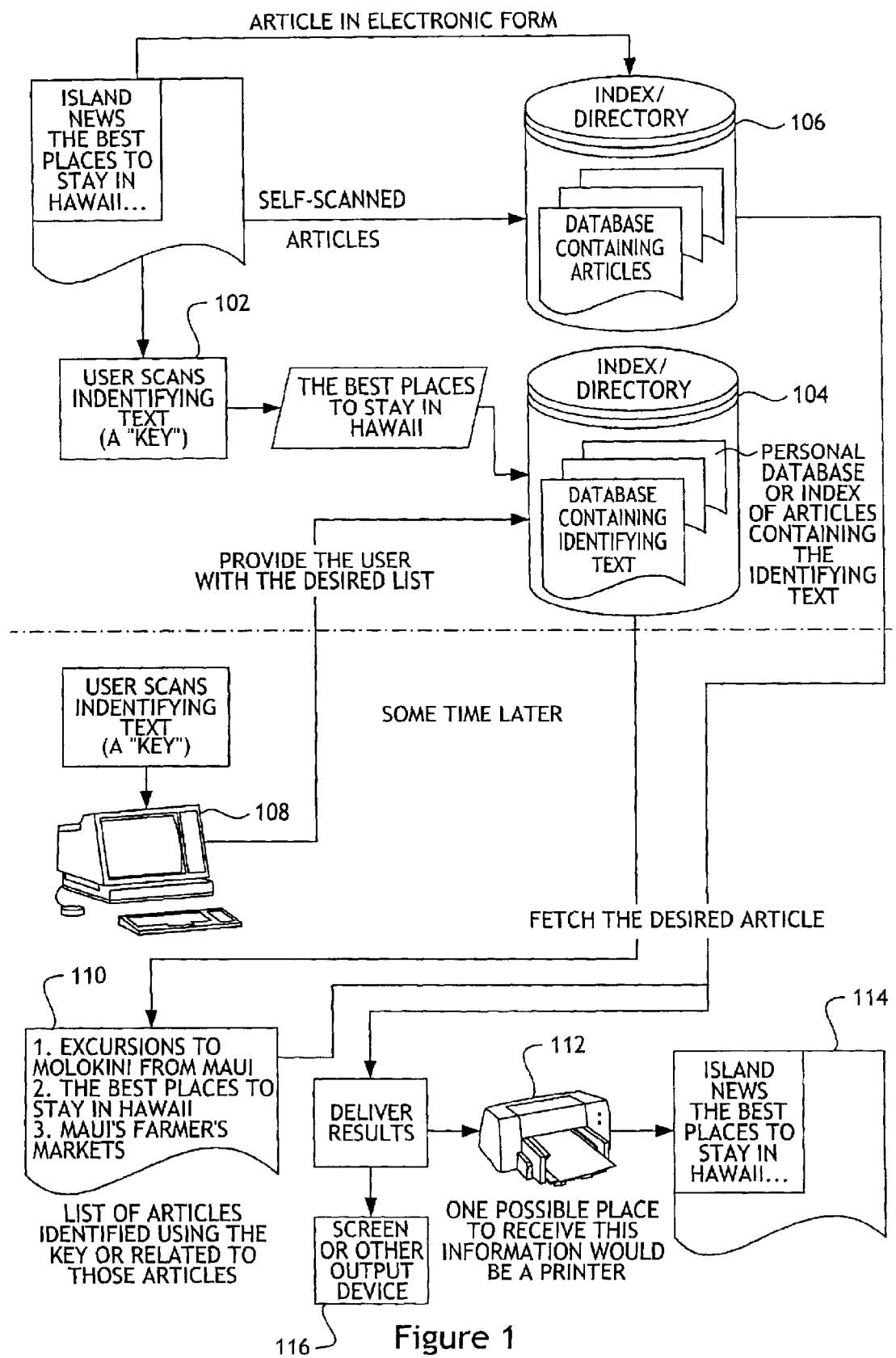
FIG. 1 is a schematic showing one embodiment of a system in accordance with the present invention.

For example, as shown in FIG. 1, for a printed article that has significance to a user, the user scans/selects/captures a small amount of identifying text 102, e.g., one or two sentences from the article. This small amount of text becomes a close-to-unique identifier for the article, and may be used as the key value entered into systems that index, classify, associate, and retrieve information. No special identifier, such as a bar code or article number, is needed. Because of the richness of human language, the one or two sentences are close to a unique key for the article.

A scanner, such as are available commercially presently, may be used to implement the capturing of text. The scanner captures the text 102, either as an image that facilitates later Optical Character Recognition (OCR) on a different system or doing OCR directly to produce the text. The information captured by the scanner is sent to one or more systems that process the scan. The scanner may be coupled to the system in any desired known manner such as, for example, using infrared (IR) transmission, a synchronizing system, a Universal Serial Bus (USB) connection or wireless or the like. While any scanner may be used, the use of small hand scanners that do OCR onboard the scanner, such as the C-Pen 600, which is available from C Technologies AB, Ideon Research Park, Scheelevagen 15, SE-223 70 LUND, Sweden, is quite convenient. The C-Pen 600 is as small as a highlighter pen and is easy to use on any size and shape paper, making scanning especially practical and easy.

Given the richness of human language, the small amount of text typically is a close-to-unique identifier of the complete article from which it was excerpted and can be used as a key. The key is stored in an index or directory 104. In one embodiment of the invention, when a new key is added to the index/directory and found to be in use already, the system sends a message to the user that the key is already in use. Generally, this will not be a problem, as the number of matching articles will be small, but it may train the user to scan or elect longer text fragments in the future. The key may be stored in an index/directory 104, and the index/directory may be used to locate the article or set of articles that match the key. Where desired, the index/directory containing the keys may be managed by a personal database, organization-wide database, or service operated by other organizations.

Where the article is in electronic form, the article may be stored in an electronic database. In one embodiment of the present invention, the article in toto is stored electronically in a database 106 to improve responsiveness and reduce dependence for article access on remotely operated systems. Clearly, this may be accomplished by scanning the article, or may be accomplished by utilizing information electronically available from commercial companies such as LexisNexis®, NorthernLight®, and the like, which have undertaken to collect, index, classify, and make available electronic versions of thousands of print collections, and information printed from electronic content located on the Internet.

Both the keys and the articles may be used to provide useful classifications and indices and to allow search, discovery and retrieval of information. Systems may be used to provide personalized keyword indices, subject and other classifications and to allow for searching through a set or subset of the information identified as being of interest. Optionally, systems may recommend relevant and/or related to the topic matters of the information being captured or retrieved such as URLs, maps, books, and other related articles. Systems may also be used to provide desired information such as personal notes for the user on a particular topic or pictures.

In practice, as information is read, users no longer need to rip out articles or fold corners of articles of interest and stack them in piles or organize them in folders. Instead, users may scan a few lines of text from the articles, for example, using a small hand scanner, where the scanned lines are used as keys and occasionally upload the scanned keys to a system that may locate and process the electronic version of the articles referenced by the keys. Thus, at a future time, when the person is interested in retrieving the articles, key words may be entered, for example on a personal computer 108, and the search conducted across the set of articles 110 that have been identified by the user as being of interest. In the example shown in FIG. 1, the clipping list of articles identified by the user as being of interest contains three articles: 1. Excursions to Molokini from Maui; 2. The best places to stay in Hawaii; and 3. Maui's Farmer's Markets. From the search results list, the more recent articles or information that are related or similar, may be noted, and the desired material may be selected. The results may be delivered to a screen or whatever output device 116 is selected. For example, where desired, the articles may be sent to a printer 112 to be printed out 114 for reference by the user.

The present invention provides for, upon a user's reading an article in print or electronically, wherein the article is of interest to the user, the user's scanning/selecting/capturing a small selected amount of text. As used hereinafter, and for purposes of claim construction, the term "scanning/selecting/capturing" refers to substantially equivalent processes by which a user who wishes to retrieve at a later date, an article or document of interest, first identifies or selects some small portion or aspect of the article or document to be used a key, or index, to retrieve the entire document, which is electronically stored elsewhere. In the case of documents or printed articles, the selected key can be "scanned" and turned into computer-storable data using an optical scanner. In the case of a document in an electronic form, the portion of the electronic document selected to be a key can be simply "selected" much as text is selected using a word processor by holding down certain keys and dragging a mouse pointer icon over portions of text on screen. In the case of graphics e.g. a portion of a picture might be "captured" or a spoken description thereof might be "captured." For purposes of claim construction, any process or data that provides for the digitization of information from or describing a document, and that is used as an index to the stored versions of such documents, is considered to be equivalent to scanning or selecting or otherwise capturing ("scanning/selecting/capturing") a portion of the document as a key. The scanned text is used as a close-to-unique identifier or key for the article. When the key is uploaded to a processing system that has access to a collection of electronic versions of printed information as well as electronic information, the key may be used to locate the electronic version of the printed/electronic article. Once the electronic version of the article is available, indices and classifications of the article may be created, manually or automatically, that allow for rapid search and retrieval using words, concepts, classifications, and the like that apply to the whole article and not just the key. Where desired, such searches may be limited only to articles that the user has seen and identified to be of interest, and hence has a known level of interest to the person. However, the present invention may also include, upon searching, providing a list of associations with other articles that may be relevant to the user, but which the user has not yet reviewed yet may be likely to desire to access.

Figure 2:
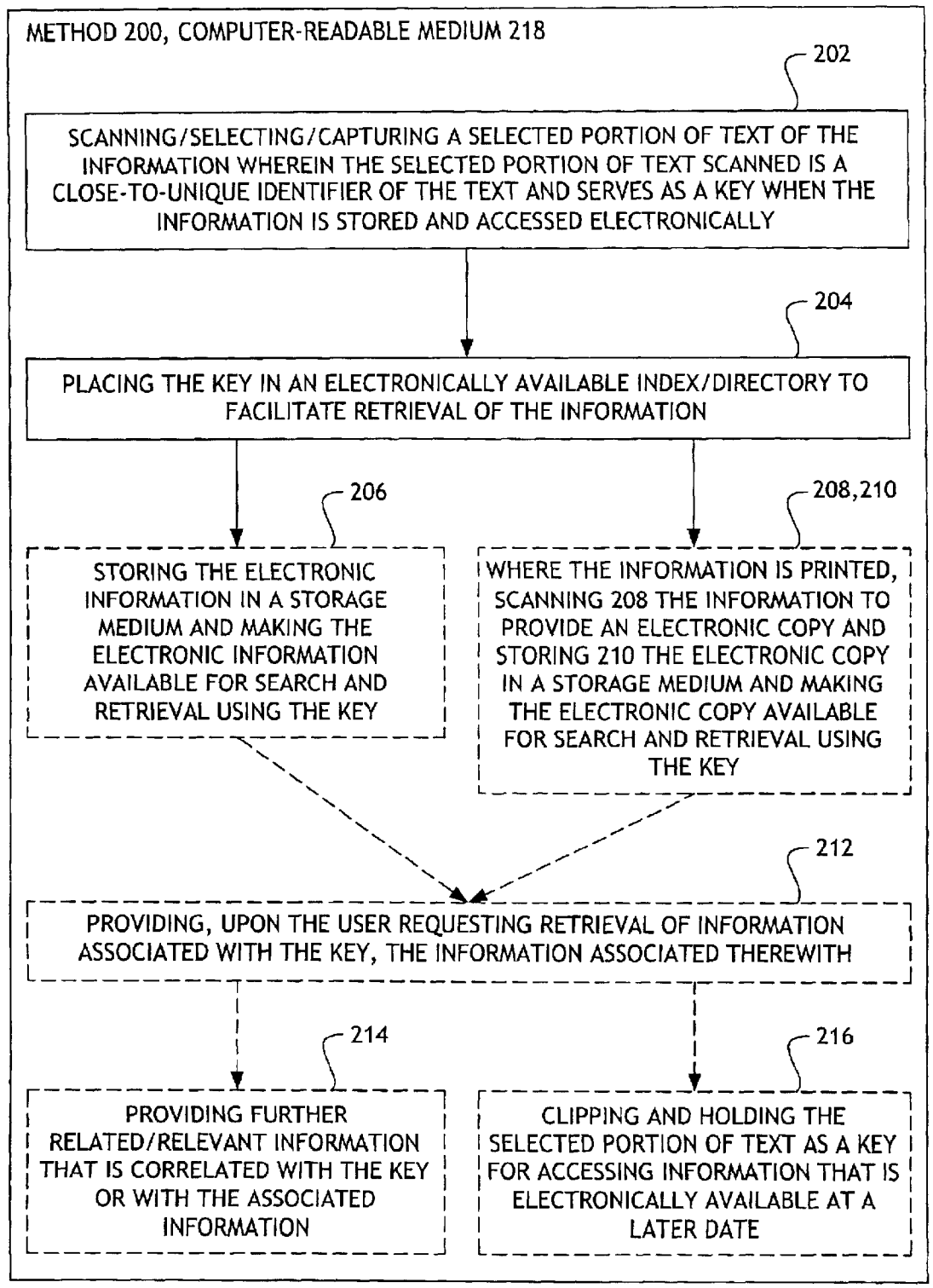
FIG. 2 is a flow chart of steps of a method for efficient information storage and retrieval of information in accordance with the present invention.

As shown in FIG. 2, the present invention provides a method for efficient information storage and retrieval of information. The method includes the steps of: scanning/ selecting/capturing 202 a selected portion of text of the information wherein the selected portion of text scanned typically is a close-to-unique identifier of the text, and serves as a "key" when the information is stored and accessed electronically; and placing 204 the key in an electronically available index/directory to facilitate retrieval of the information. A close-to-unique identifier is defined as a selected portion of text that the user chooses as highly likely, when used to identify information to be retrieved, to retrieve the text associated therewith. In practice, for information across a broad range of academic, business, and personal content, suitable text can be very easily chosen, such as the first sentence or first line of text of an article. Typically, the information is in electronic form and the method may further include a step of storing 206 the electronic information in a storage medium and making the electronic information available for search and retrieval using the key.—Where the information is printed, the method 200 may include the steps of scanning 208 the information to provide an electronic copy of the information and storing 210 the electronic copy of the information in a storage medium and making the electronic copy available for search and retrieval using the key. Steps 206, 208, and 210 are typically done by someone other than the user. The information may be stored in a personal or organization-wide database, or may be obtained from a commercially accessible database. In addition, the search mechanism may be arranged to search hard drives or any selected storage medium. The method may further include, upon the user requesting retrieval of information associated with the key, providing 212 the information associated therewith. Where desired, further related/relevant information may also be provided 214 that is correlated with the key, with associated information, or both. In addition, in a forward mode of use, where a time period exists between a printed publication and actual storage of an electronic version of the information in an available database, the user may clip and hold 216 a key so that the information may be accessed at a later date. Thus, the selected portion of text serves as a "clip and hold" key for accessing information that is electronically available at a later date. Where desired, the method may be implemented by a computer-readable medium 218 with computer-executable instructions to carry out the steps of the method. In one embodiment, the computer-executable instructions may be used to provide an index/directory for incoming information such as business forms or resumes, and the keys in the index/directory are placed on a web page or database that is accessible from distributed locations so that documents associated with the keys may be accessed from many locations. In such a system, the documents may be stored in distributed locations. Where desired, clearly a user may simply upload keys for his own account and store such keys on an intermediate index/directory for his own use.

Figure 3:
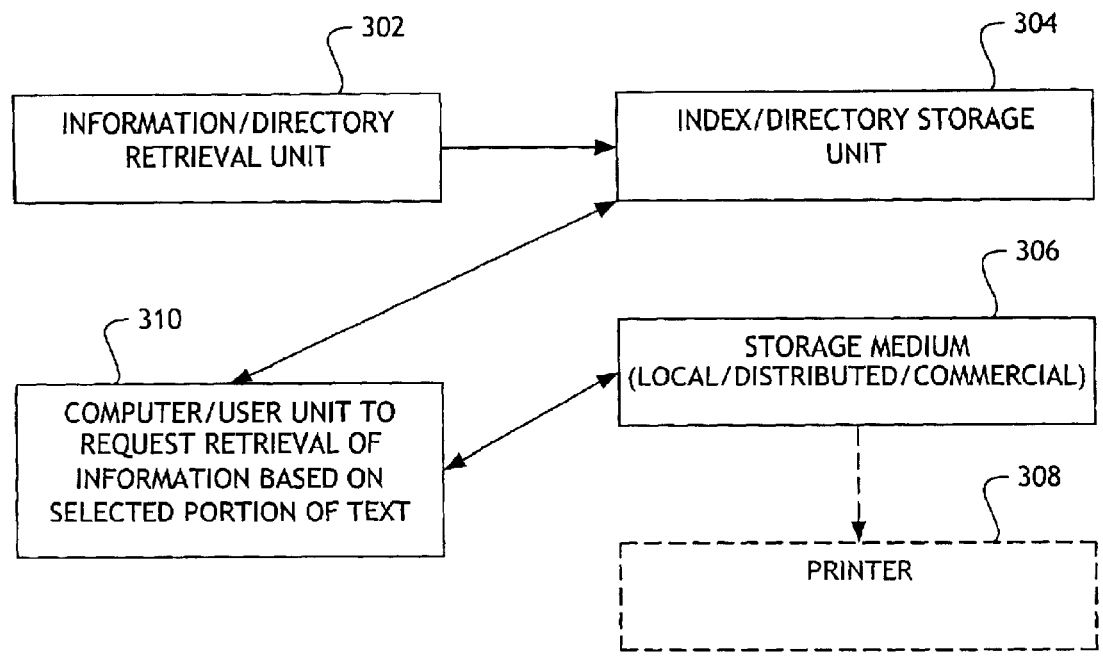
FIG. 3 is a block diagram of a system for efficient information storage and retrieval of information in accordance with the present invention.

As shown in FIG. 3, the present invention may include a system for efficient information storage and retrieval of information. Typically, the system includes an index/ directory information retrieval unit 302 (typically a scanner), an index/directory storage unit 304 and a storage medium 306. The index/directory information retrieval unit 302 is arranged to be utilized for scanning, selecting or capturing a portion of text of the information and sending the portion of text to a index/directory storage unit 304. The portion of text typically is a close-to-unique identifier of the complete information from which it was excerpted and serves as a "key". The information is stored and accessed electronically. The index or directory storage unit 304 is arranged to receive and store the key from the index or directory information retrieval unit 302 and may also test the referenced information itself. The key is placed in an electronically available index/directory in the index/directory storage unit where the keys may be used to facilitate retrieval of the information from which the key was selected from the storage medium 306 in which the information is accessible electronically. The storage medium 306 is used to store information that is accessible electronically, and the index/directory storage unit 304 is arranged to be identify information in the storage medium 306 that corresponds to the key. The information is typically in electronic form. However, when the information is in printed form, the information is typically scanned and processed and stored in electronically accessible form in the storage medium 306. The information may be stored in a personal or organization-wide database, or the information may be obtained from a commercially accessible database. The steps may further include, upon the user requesting retrieval of information associated with the key, providing the information associated therewith. Where desired, further related/relevant information may also be provided that is correlated with the key. Also, for use in a forward mode, where a time period exists between a publication and actual availability of an electronic version of the information in an archive, the user may clip and store a key so that the information may be accessed at a later date. Hence, the selected portion of text is utilized as a "clip and hold" key for accessing information that is electronically available at a later date. Either a separate database may be used for such clip and hold keys, or the key may include an indicator that shows that the information is to be accessed at a later date. Typically, a computer/user unit 310 is coupled to or arranged to receive/send information from/to the index/directory unit 304 and the storage medium 306 and is used to request retrieval of information based on the key. The user may request, for example, that the information be sent to a printer 308 for generating a printed copy of the information.

The keys and/or information to be stored electronically may be transmitted using an infrared connection, a wired connection, and/or a telephone connection. The keys and/or information may be sent to a personal computer or other device having a storage medium. A camera using a wireless, wired, or infrared connection may be arranged to provide information to the system.

Figure 4:
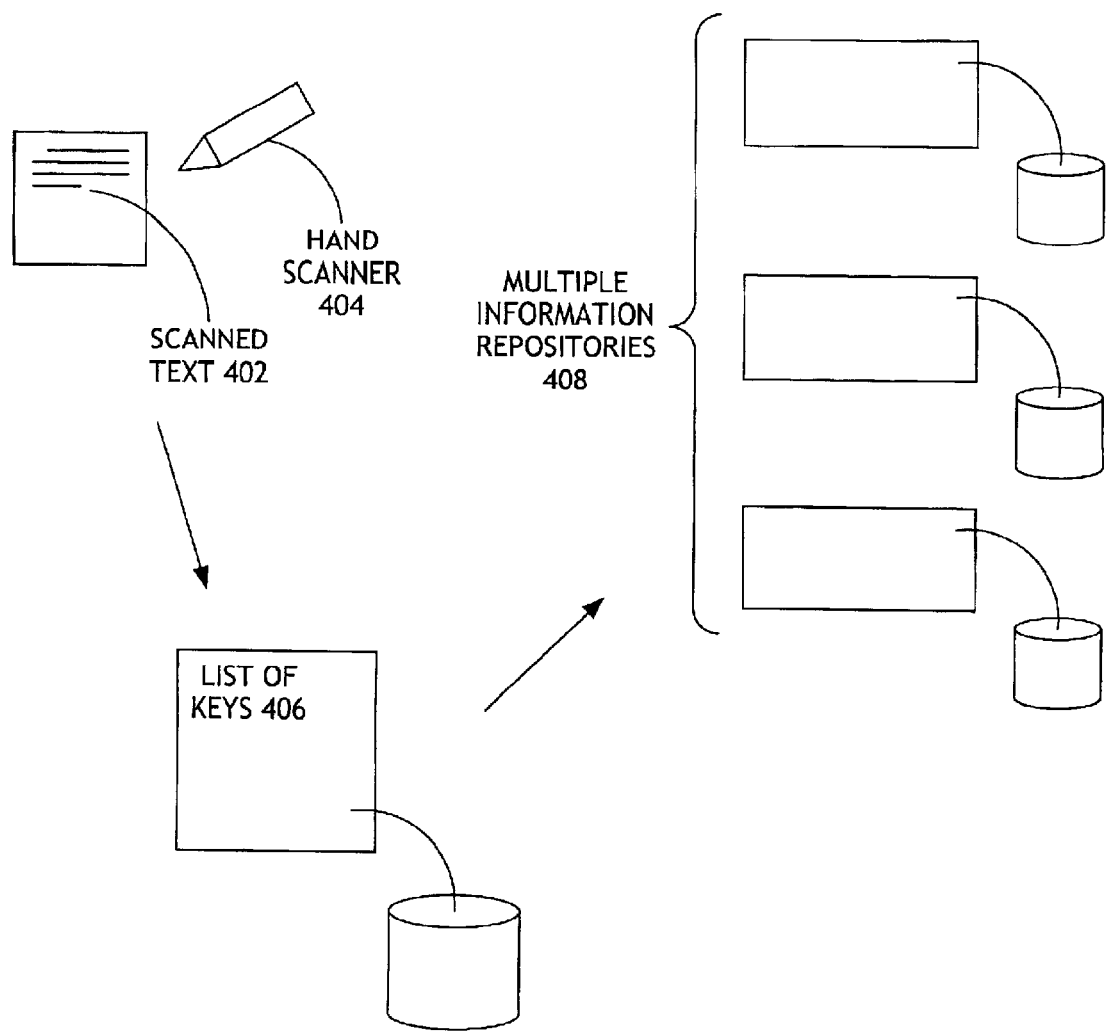
FIG. 4 is a schematic of an embodiment of the present invention in which scanned keys are stored in an index/ directory and the keys are associated with multiple information repositories containing electronic versions of articles or information.

FIG. 4 is a schematic of an embodiment of the present invention in which scanned keys are stored in an index/directory and the keys are associated with multiple information repositories containing electronic versions of articles or information. Typically, a hand scanner 404 may be used to scan the "key" (scanned text 402). The key is then added to an index/directory of keys 406, which may be generated over a period of time. The index/directory of keys 406 may be stored locally or in a central location or distributed across locations but integrated using computer-executed instructions. The keys may be used to locate articles of interest or information, typically automatically fetching the articles and indexing or categorizing them. The index/directory of keys 406 may be associated with one information repository or multiple information repositories that store an electronic version of the article or information. The information is typically indexed for fast searching and classified for category browsing, improved search, and other uses. Where desired, the system may retrieve the articles that match the key or keys and build a local or personal index of all the articles so that the articles may be searched rapidly by a user using search words. Thus, the user may utilize the system to identify articles or browse a directory of articles that is generated without using the keys.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method for efficient information storage and retrieval of information, comprising the steps of:
    capturing with a scanner a selected portion of text of printed information wherein the selected portion of text captured is user defined topic classification indicia keys with a close-to-unique identifier of the text for recommending user defined topic matters, and serves as a key when the information is accessed electronically;
    placing the key in an electronically available index to facilitate retrieval of the information; and
    recommending topic matters based on the user defined topic classification indicia keys of previously scanned text of printed information and previously stored electronic information that are related to the printed information being captured during retrieval of the printed information.

2. The method of claim 1 wherein a portion of the information is in electronic form and the method further includes a step of storing the electronic information in a storage medium and making the electronic information available for search and retrieval using the key.

3. The method of claim 1 further including the steps of scanning and processing the information to provide an electronic copy of the information, storing the electronic copy of the information in a storage medium and making the electronic copy available for search and retrieval using the key.

4. The method of claim 1 wherein the information is stored in a non-commercially accessible database.

5. The method of claim 1 wherein the information is obtained from a commercially accessible database.

6. The method of claim 1 further including, upon the user requesting retrieval of information associated with the key, providing the information associated therewith.

7. The method of claim 1 wherein the recommended topic matters include at least one of related uniform resource locators (URLs) to web pages, maps, books, and related articles.

8. The method of claim 1 further including clipping and holding the selected portion of text as a key for accessing information that is electronically available at a later date.

9. A system for efficient information storage and retrieval of information, comprising:
    an index information retrieval unit, arranged to send a selected portion of text of printed information to an index storage unit, for capturing with a scanner the selected portion of text of the information wherein the selected portion of text is a user defined topic classification indicia key with a close-to-unique identifier of the text and serves as a topic classification key for recommending user defined topic matters when the information is desired to be accessed electronically;
    the index storage unit, arranged to receive and store the user defined topic classification indicia key from the index information retrieval unit, for placing the key in an electronically available index to facilitate retrieval of the information from a storage medium that is accessible electronically; and
    the storage medium that is accessible electronically, wherein the storage medium is arranged to be searched using the key held in the index to identify information in the storage medium that corresponds to the key,
    wherein a computer unit is arranged to send and receive information from and to the index storage unit and the storage medium, and is arranged to request retrieval of information based on the key and configured for recommending topic matters based on keys of previously scanned text of printed information and previously stored electronic information that are related to the printed information being captured during retrieval of the information.

10. The system of claim 9 wherein the information is in electronic form and the information is stored in electronic form in a storage medium and made accessible for search and retrieval and presentation.

11. The system of claim 9 wherein the information is printed and the information is scanned to provide an electronic copy of the information which is then stored in a storage medium and made accessible for search and retrieval and presentation.

12. The system of claim 9 wherein the information is stored in a non-commercially accessible database.

13. The system of claim 9 wherein the information is obtained from a commercially accessible database.

14. The system of claim 9 wherein the information is obtained from local accessible storage media.

15. The system of claim 9 further including, upon the user requesting retrieval of information associated with the key, providing the information associated therewith.

16. The system of claim 9 wherein further related information is also provided that is correlated with at least one of: the key and associated information.

17. The system of claim 9 wherein the selected portion of text is a "clip and hold" key for accessing information that is electronically available at a later date.

18. A computer-readable medium having computer-executable instructions for performing steps for efficient information storage and retrieval of information, comprising the steps of:
    capturing with a scanner a selected portion of text of printed information wherein the selected portion of text scanned is a user defined topic classification indicia key with a close-to-unique identifier of the text and serves as a topic classification key for recommending user defined topic matters and where the information is stored and accessed electronically;

placing the key in an electronically available index to facilitate retrieval of the information; and recommending topic matters based on the user defined topic classification indicia keys of previously scanned text of printed information and previously stored electronic information that are related to the information being captured during retrieval of the printed information.

19. The computer-readable medium of claim 18 wherein the information is in electronic form and the steps further include retrieving and indexing the information context identified by the index for fast retrieval and processing.

20. The computer-readable medium of claim 18 wherein the information is in electronic form and the steps further include a step of storing the electronic information in a storage medium and making the electronic information accessible for search and retrieval and presentation.

21. The computer-readable medium of claim 18 wherein the information is printed and the steps further include steps of scanning and processing the information to provide an electronic copy of the information and storing the electronic copy of the information in a storage medium and making the electronic copy accessible for search and retrieval and presentation.

22. The computer-readable medium of claim 18 wherein the information is stored in non-commercially accessible database.

23. The computer-readable medium of claim 18 wherein the information is obtained from a commercially accessible database.

24. The computer-readable medium of claim 18 wherein the steps further include, upon the user requesting retrieval of information associated with the key, providing the information associated therewith.

25. The computer-readable medium of claim 18 wherein further related information is also provided that is correlated with at least one of: the key and associated information.

26. The computer-readable medium of claim 18 wherein the selected portion of text is a "clip and hold" key for accessing information that is electronically available at a later date.

27. A computer-readable medium having computer-executable instructions for performing steps for efficient information storage and retrieval of information, comprising the steps of:

capturing with a scanner a selected portion of text of incoming printed information wherein the selected portion of text scanned is user defined topic classification indicia keys with a close-to-unique identifier of the text and serves as a topic classification key for recommending user defined topic matters when the incoming printed information is stored and accessed electronically;

placing the key in an electronically available index on a web page accessible area to facilitate search and retrieval of desired incoming information; and recommending topic matters based on the user defined topic classification indicia keys of previously scanned text of printed information and previously stored electronic information that are related to the information being captured during retrieval of the printed information.

28. The computer-readable medium of claim 27 wherein the information is in electronic form and the steps further include a step of storing the incoming electronic information in a local distributed storage medium and making the electronic information available for search and retrieval and presentation.

29. The computer-readable medium of claim 27 wherein the incoming information is printed and the steps further include steps of scanning and processing the information to provide an electronic copy of the information and storing the electronic copy of the information in a storage medium and making the electronic copy available for search and retrieval and presentation.

30. The computer-readable medium of claim 27 wherein the incoming information is stored in an electronic database.

31. The computer-readable medium of claim 27 wherein the incoming information is obtained from a commercially accessible database.

32. The computer-readable medium of claim 27 further including, upon the user requesting retrieval of information associated with the key, providing the information associated therewith.

33. The computer-readable medium of claim 27 wherein further related information is also provided that is correlated with at least one of: the key and associated information.

34. The computer-readable medium of claim 27 wherein the selected portion of text is a "clip and hold" key for accessing incoming information that is electronically available at a later date.

* * * * *